United States Patent [19]

Lynn

[11] Patent Number: 4,766,691
[45] Date of Patent: Aug. 30, 1988

[54] BAIT WELL REPLENISHER

[76] Inventor: Donald Lynn, 9267 Prosperity Farm Rd., Lake Park, Fla. 33403

[21] Appl. No.: 71,371

[22] Filed: Jul. 9, 1987

[51] Int. Cl.$^4$ .............................................. B63B 35/26
[52] U.S. Cl. ............................................. 43/55; 43/57
[58] Field of Search ....................................... 43/55-57

[56] References Cited

U.S. PATENT DOCUMENTS

| 2,721,718 | 10/1955 | Wagner | 43/55 X |
| 2,966,002 | 12/1960 | Hobson et al. | 43/55 |
| 2,974,437 | 3/1961 | Stadler | 43/55 |
| 4,074,651 | 2/1978 | Arduser | 43/57 X |
| 4,168,590 | 9/1979 | Beshoner, Sr. | 43/55 |

Primary Examiner—M. Jordan
Assistant Examiner—Carmine Cuda
Attorney, Agent, or Firm—Malin, Haley & McHale

[57] ABSTRACT

This invention relates generally to apparatus for replenishing the supply of fresh water to a bait well or bucket of a waterborne vessel, and more particularly to a housing removably connectable to a bracket on the exterior of the transom of a motor-powered fishing boat, said housing having a depending ram water pickup extending generally below the bottom surface of the craft, said pickup enclosing an aperture in the housing for conveying a forced flow of water from the exterior of said housing to the bait well or bait bucket of the boat while the boat is moving across the water. A small "silent-type" electric water pump is associated with the housing for selectively supplying the live bait well with a supply of fresh water from the body of water being fished from while the boat is at rest.

1 Claim, 2 Drawing Sheets

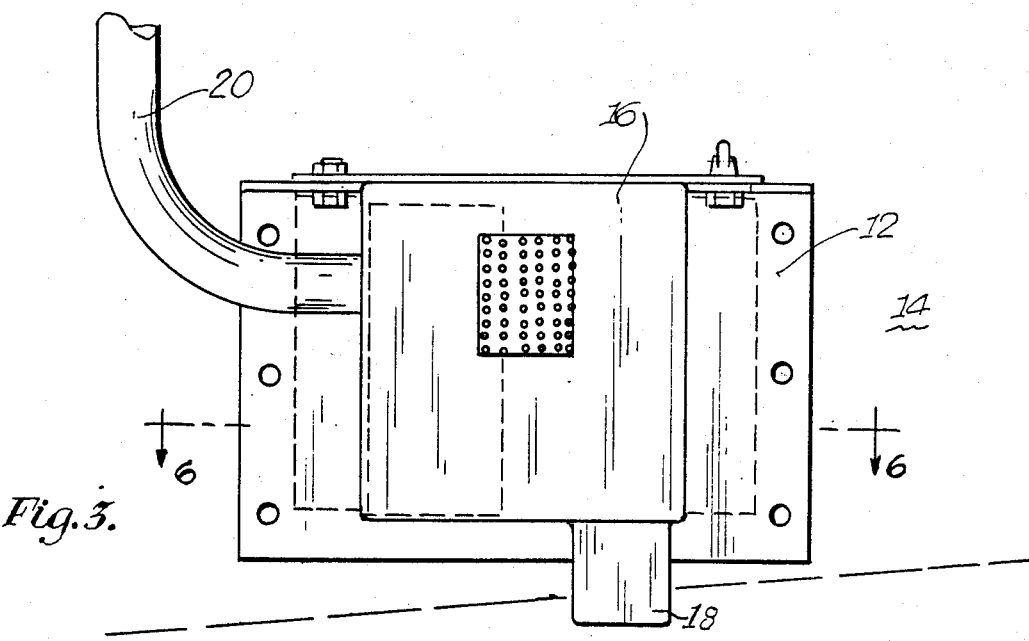
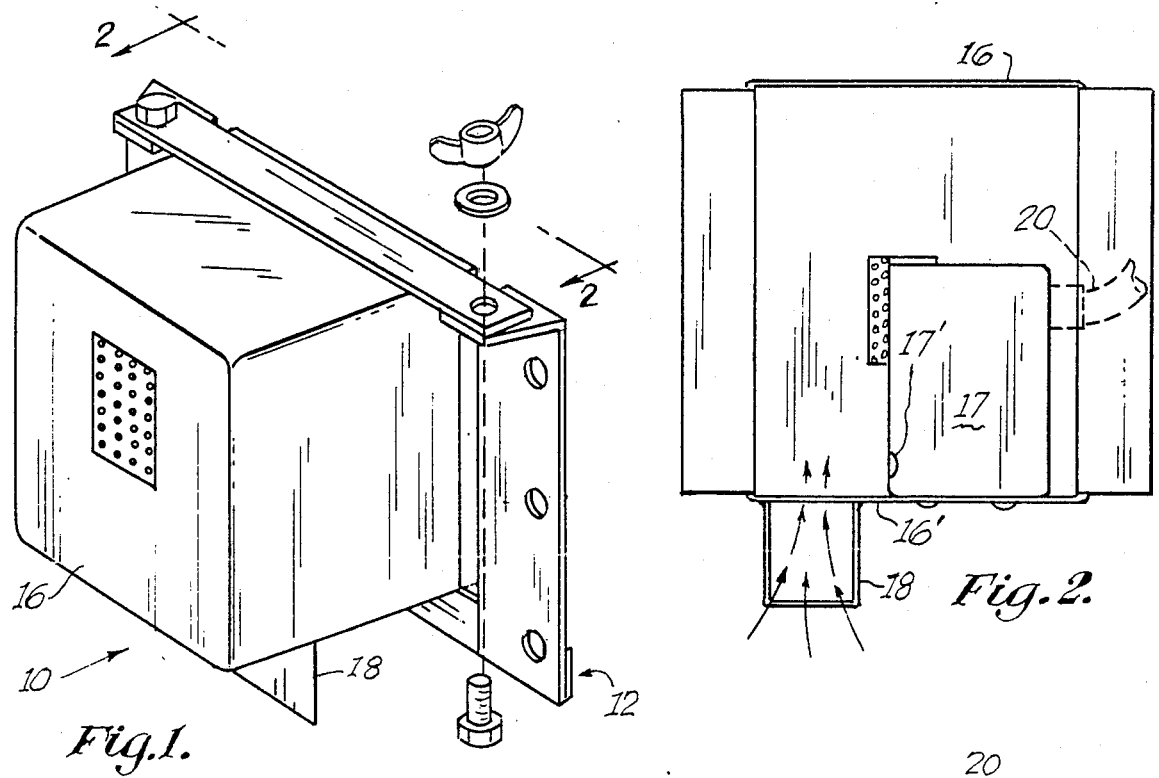
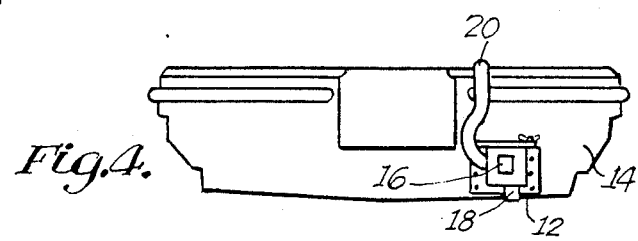

BAIT WELL REPLENISHER

BACKGROUND OF THE INVENTION

1. Field of the Invention

This invention relates generally to apparatus for replenishing the supply of fresh water to a bait well or bucket of a waterborne vessel, and more particularly to a housing means removably connectable to a bracket means on the exterior of the transom of a motor-powered fishing boat, said housing means having a depending ram water pickup means extending generally below the bottom surface of the craft, said pickup means enclosing an aperture in the housing means for conveying a forced flow of water from the exterior of said housing means to the bait well or bait bucket of the boat while the boat is moving across the water. A small "silent-type" electric water pump is associated with the housing means for selectively supplying the live bait well with a supply of fresh water from the body of water being fished from while the boat is at rest.

2. Description of the Prior Art

The typical angler is familiar with the problems of keeping shrimp, minnows and other bait alive and active during long periods of fishing. When large numbers of these bait animals are confined to a relatively small area, they quickly deplete the oxygen supply within the container and become sluggish in their movement or die. These generally inactive bait animals are not nearly as desirable to the fish as fresh bait, and therefore after long periods of fishing the luck of the angler is diminished.

Previous efforts at maintaining live bait in a vivacious condition are well known. For instance, prior bait boxes or containers were lowered over the side the fishing vessel and attached to a line or rope and allowed to bob in the water while the angler fished. The above suffered the obvious shortcoming of having to be withdrawn from and replaced into the water when the angler decided to move the fishing vessel. These containers are often forgotten and the entire container is lost when forcibly dragged through the watter, or the bait contents lost because of the opening of the cover thereof.

Further representative efforts to keep bait fresh are shown in U.S. Pat. No. 3,357,127 to Barradale and in U.S. Pat. No. 3,593,453 to Bishop which show bait sleds which are towed behind a motor powered boat on a towing rope which could easily become entangled in the boat's propeller under normal circumstances. Further, the above patents teach the use of a hydrodynamic ram water intake means which injects turbulent water directly into the fish bait container. Introduction of turbulent water therein creates an unnatural environment which can lead to the untimely demise of the live bait.

Still further efforts at maintaining live bait in a spirited condition show the use of transom mounted external bait buckets having means for introducing fresh water therein while the boat is moving. One major problem inherent in bait buckets mounted on the external side of the transom is the awkwardness of attempting to retrieve live bait therefrom without upsetting the balance of the boat. Most small fishing boats are quite "tender" and extraneous movements by the angler are to be minimized for safety. Examples of the above are found in the following U.S. Pat. Nos.: 2,485,684—Aldredge; 3,220,140—Shirley; 3,315,403—Smith; 3,797,160—Lewis.

Live bait wells have been incorporated to the interior of such boats and water recirculation systems incorporated therewith as shown in U.S. Pat. Nos. 4,033,280 to Wood et al. and 4,275,522 to Glover. Wood et al. relies on complicated structure and cannot provide water recirculation to the fish while the boat is moving (column 1, lines 65-68). Glover discloses a ram water intake structure for recirculating fresh water to the bait in a live bait well but does not provide means for recirculating fresh water to the bait when the boat is not moving. Inasmuch as an angler who finds a favored fishing spot may stay there for hours at a time, the lack of fresh water to the bait will lead to an obvious result.

Also of interest is U.S. Pat. No. 2,151,225 to Newton which discloses the use of an outboard motor on a fishing boat wherein a proportion of the flow of cooling water extracted from the body of water to cool the outboard motor is intercepted and diverted toward a live bait well. Inherent in such a process is the danger of overheating and/or reduction in the power output of the motor. Today's high speed motors are designed to utilize a critical flow rate of coolant therein and any reduction in that flow rate could result in damage to the motor. Further, such motors tend to be particularly clamorous and, as such, frightening to the pescatorial prey.

SUMMARY OF THE INVENTION

The instant disclosure provides a solution to the above noted shortcomings in the prior art by way of a novel housing means removably securable to a bracket structure fixed to the exterior of a boat transom, said housing means having a ram water intake scoop for providing a forced flow of fresh bait water to a live bait well while the boat is moving across a body of water. Said housing means is further constructed to house a "silent-type" electric motor and water pump means for conveying fresh water from said body of water to the live bait well when the boat is not moving across the water. The ram water scoop is disposed slightly below the bottom plane of the boat so as to be exposed to passing water when the boat is in motion, the remainder of the housing means being generally out of the water while the boat is moving. When the boat is not moving, the stern sits down lower in the water and causes the housing means and water pump to be submerged wherein the pump can be actuated to provide a flow of fresh water to the live bait well.

It can be seen therefore that the device of the instant invention can be used to replenish the supply of bait water to a live bait well mounted within a fishing boat, both while the fishing boat is moving across the water and while the angler is fishing with the boat at rest. The housing means and pump connected thereto are quickly and slidingly removable from the bracket structure on the transom of the boat for purposes of both security from theft and avoidance of barnacle and other buildup which may impede the performance of the pump and flow of water. A bracket structure for slidingly receiving said housing means is rigidly affixed to the transom of the boat. Thereafter, quick release means associated with said bracket structure may be employed to remove and/or replace the housing means in position for operation. Preferably, quick-disconnect remote means may be employed for enabling and disabling the water pump. A water conveying conduit is connected between the outlet of the water pump and the live bait well. When the pump is on, water is discharged through said conduit into the well. When the pump is turned off and the boat is moving across the water, the great pressure created by water entering through the aperture in the floor of the housing means causes water to be forced through the water pump, conduit and into the well.

It is a primary object of the present invention to provide a novel housing means capable of supplying a fresh source of water to a live bait well mounted within a motor powered fishing boat, both while the boat is moving across the water and while it is stationary.

It is another object of the present invention to provide a means for providing a fresh supply of water to a live bait well mounted to a fishing boat while said boat is not moving across the water wherein said means is easily removable when the boat is not being used for fishing.

It is a further object of the invention to provide a live bait well water replenishment system having both passive and active recirculation capability.

It is a still further object of the present invention to provide a live bait well water replenishment system that is self-contained, compact and easily removable for security purposes, for its is well known that add-on devices are very popular among anglers and that thefts of such devices are commonplace.

It is an even further object of the present invention to provide a live bait well water replenishment system which can also be used to provide a supply of water for washing down the fishing boat after use to prolong the useful life thereof.

BRIEF DESCRIPTION OF THE DRAWINGS

FIG. 1 is a perspective partially exploded view of the bait water replenishing system of the instant invention.

FIG. 2 is an elevational view showing the internal recess of the housing means taken along the direction of lines 2—2 of FIG. 1.

FIG. 3 shows a close-up elevational view of the bait water replenishing system mounted to the transom of a boat (shown in phantom).

FIG. 4 is a rear elevational view of the device mounted to a transom of a power fishing boat.

DETAILED DESCRIPTION OF THE PREFERRED EMBODIMENT

Figure 5:
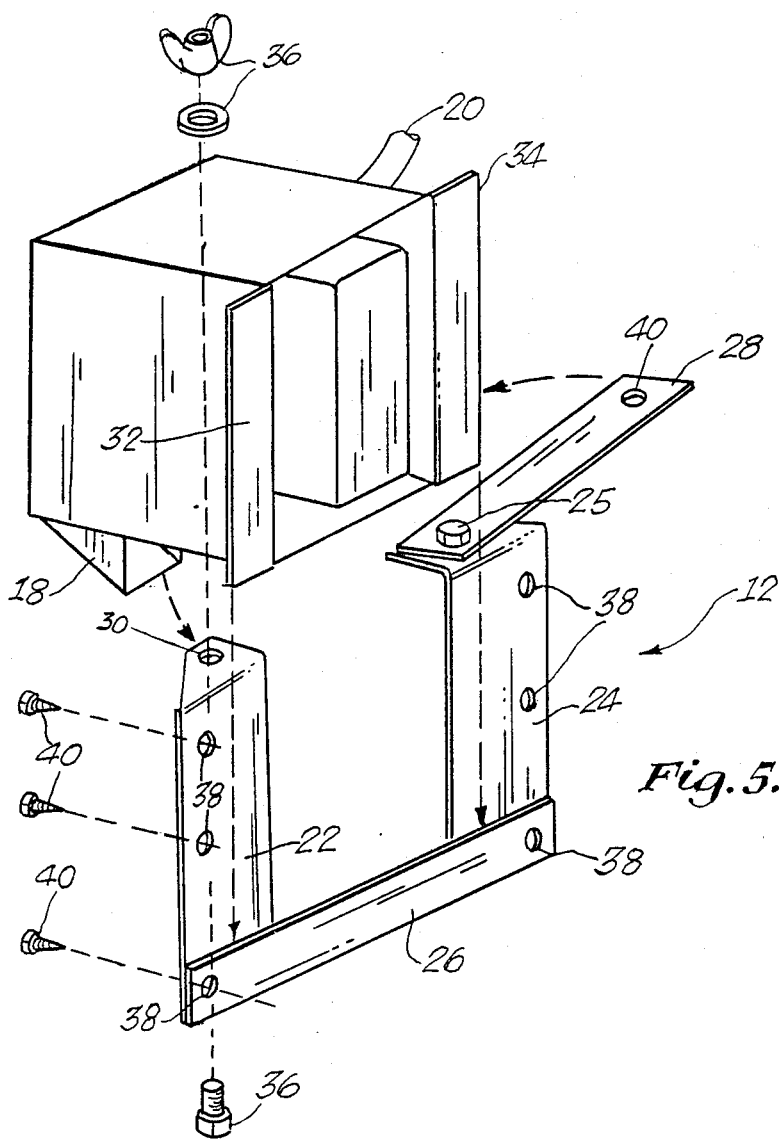
FIG. 5 shows an exploded perspective view of the housing means positioned to be received by the transom mountable bracket means for securement thereto.

Referring now to the drawings, FIGS. 1 and 4 show a bait well replenishing system and structure 10 mountable to the transom 14 of a motor powered fishing boat. This system is comprised generally of a bracket means 12 rigidly mountable to transom 14. Slidably associated with bracket means 12 is a housing means 16 suitable for carrying an electric water pump 17, said housing means 16 further having a depending ram water intake scoop 18 communicating the exterior of housing means 16 to the interior thereof. A bait well replenishing conduit 20 communicates the discharge orifice of pump 17 with a live bait or fish well (not shown) borne by the power boat. In the preferred embodiment a portion of scoop 18 is positioned slightly below the bottom surface of the water craft so as to be exposed to a forced supply of water while the boat is moving across the water. The intake 17' of water pump 17 is to be immersed in water when the boat is at rest.

In use, as the boat is moving across the water, scoop 18 receives a forced supply of water therein, said forced supply being conveyed into the interior of housing means 16 by way of through openings in the floor 16' of housing means 16, as best seen in FIG. 2. The hydrostatic pressure buildup caused by the forced supply of water within the interior of housing means 16 causes said water to be conveyed via conduit 20 to the live bait well within the boat. When the boat is at rest, the stern sits generally lower in the water than when it is moving, which causes water pump inlet 17' to be immersed. At these times, water pump 17 can be selectively energized to provide an additional replenishing supply of water via conduit 20 as desired. Preferably, water pump 17 is comprised of a silent electric motor integrally connected to a water pump impeller. The electric motor is preferably energizable from a remote location within the easy reach of the angler.

In greater detail, as best seen in FIGS. 1, 3, 5 and 6, bracket means 12 is a rectangular, generally planar, member, comprised of a pair of vertical sides 22 and 24, a lower horizontal cross member 26 rigidly connected to members 22 and 24 at right angles thereto, and an upper cross member 28 pivotably connected to member 24 about hinge pin connecting means 25. Members 22 and 24 have generally L-shaped upper ends each having an aperture 30 therein. Preferably, bracket means 12 is connected to transom 14 by way of apertures 38 disposed in members 22 and 24 as shown in FIG. 5 and having connecting means such as a plurality of threaded screws 40 disposed therethrough. In the embodiment shown in FIG. 5, cross member 26 is connected to the transom-facing surfaces of members 22 and 24 and therefore a space is left between members 22 and 24 and transom 14 equal to the depth dimension of cross member 26 corresponding to the dimension x shown in FIG. 6. This dimension x is preferably slightly larger than the thickness of planar ears 32 and 34 of housing means 16 so that said ears can be received in sliding engagement therein, as will be set forth more fully hereinafter. Once housing means 16 is slid into engagement between bracket means 12 and transom 14, upper cross member 28 can be swung as shown by the curved arrow in FIG. 5 to overlay the top of housing means 16 and quick release means 36 may be employed through aligned apertures 30 and 40 to secure upper cross member 28 between members 22 and 24. This arrangement allows housing means 16 to be releasably fixed to bracket means 12 and therefore transom 14. Said quick release means may be of any suitable variety, example of which is shown in FIG. 5 as a bolt and wing nut/washer arrangement.

Figure 6:
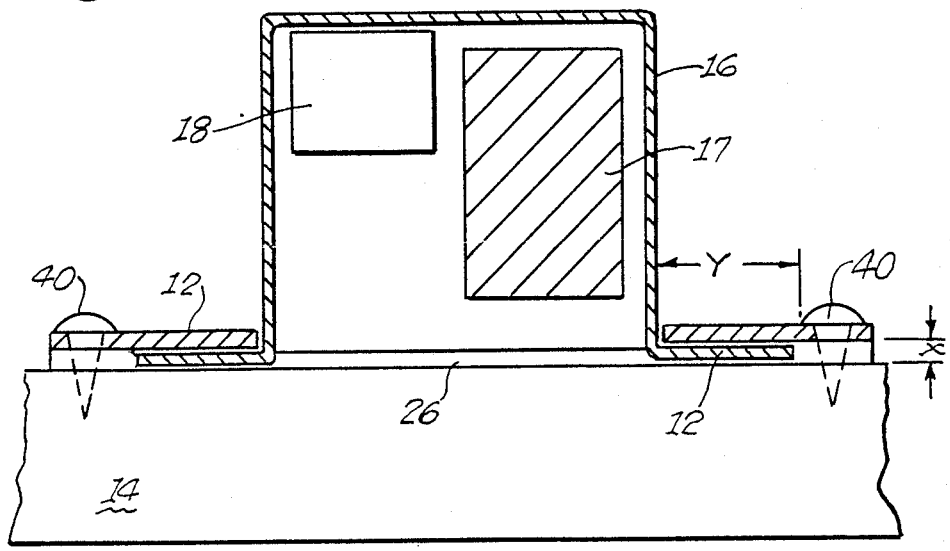
FIG. 6 is a partial cut-away of the view shown in FIG. 3 taken along lines 6—6.

Suitable spacing means, preferably on the order of thickness of the dimension "X" shown in FIG. 6, may be employed between each of members 22 and 24 and transom 14 in the vicinity of the securement apertures 38 therein so as to cause members 22, 24 and 26 to be flush with the plane of transom 14. Adequate space must be left in both the "X" and "Y" directions, as shown in FIG. 6, however, for positioning of ears 32 and 34 of housing means 16 in the space.

Housing means 16 is comprised of a generally rectangular shaped housing capable of enclosing therein an electric motor and water pump combination 17 having an aperture therein aligned with the discharge orifice of water pump 17 for connection to a water conveying conduit 20 so as to communicate the live bait well with the output of the water pump 17. Housing means 20 is comprised further of depending ram water intake scoop 18 which communicates the exterior of housing means 16 with the interior thereof via through-openings in the floor 16' of housing means 16.

It can therefore be seen that the instant invention comprises a novel structure for supplying a live bait well borne by a motor powered fishing boat with fresh water, both while said boat is moving across the water and at rest. The above is accomplished in the manner set forth previously, said structure being removable from the transom 14 of the boat for the purposes of avoiding theft thereof and/or barnacle or other unwanted buildup of matter which can interfere with the performance of the pump and/or the flow of replenishing water. An overflow drain-off conduit may be employed to maintain the water level in the bait well constant and may simply be comprised of a conduit communicating the well with the body of water.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for replenishing the water in a live inboard bait well of a motor powered fishing boat, comprised of:

a bracket means connectable to the transom of a fishing boat;

a housing means slidingly and removably connectable to said bracket means;

said housing means encapsulating an electric motor/water pump unit, said housing means further having a water pickup means communicating the exterior of said housing means with the interior thereof, said water pickup means aligned at least partially below the bottom surface of the boat to receive a forced flow of water therein when the boat is moving across a body of water;

water flow conduit means communicating said electric motor/water pump with said live bait well;

said water pickup means is a fixed depending ram water intake scoop;

said bracket means is comprised of a generally rectangular planar member rigidly connectable to the transom of a fishing boat, said bracket having means for receiving in sliding engagement said housing means and securing said housing means in connection thereto by way of a quickly disconnectable means for holding;

said housing means having an upper surface;

said means for holding is comprised of a pivotable elongated member connected to one end of said bracket means and swingable into and out of association with the other side of said bracket means, said housing means being slidable into and out of association with said bracket means when said means for holding is swung out of association with said other side of said bracket means, said housing means being fixable in association with respect to said bracket means when said means for holding is swung into association with said other side of said bracket means, said elongated member abutting the upper surface of said housing means in planar contact;

said means for holding is comprised of a generally elongated rigid bar pivotably connected at one end to one side of said bracket means, said rigid bar being removably connectable to the other end of said bracket means by way of a quick-disconnect means for attachment;

the quick-disconnect means for attachment is comprised of a bolt and wing nut combination.

* * * * *